Oct. 3, 1933.  A. I. MARCUM  1,928,860
FLEXIBLE SUSPENSION FOR MULTIWHEEL VEHICLES
Filed Feb. 3, 1930   3 Sheets-Sheet 1
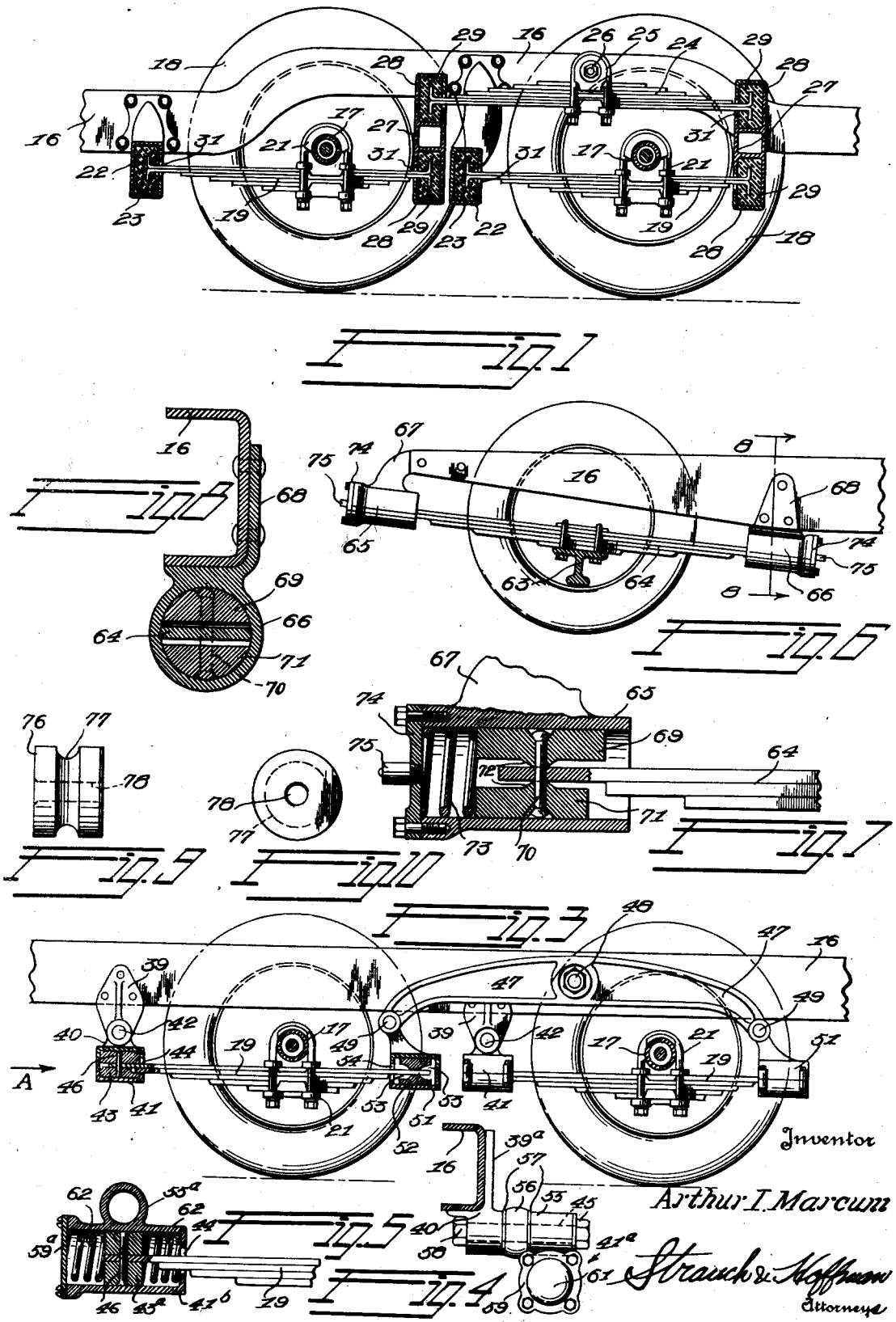
Inventor
Arthur I. Marcum
Strauch & Hoffman
Attorneys

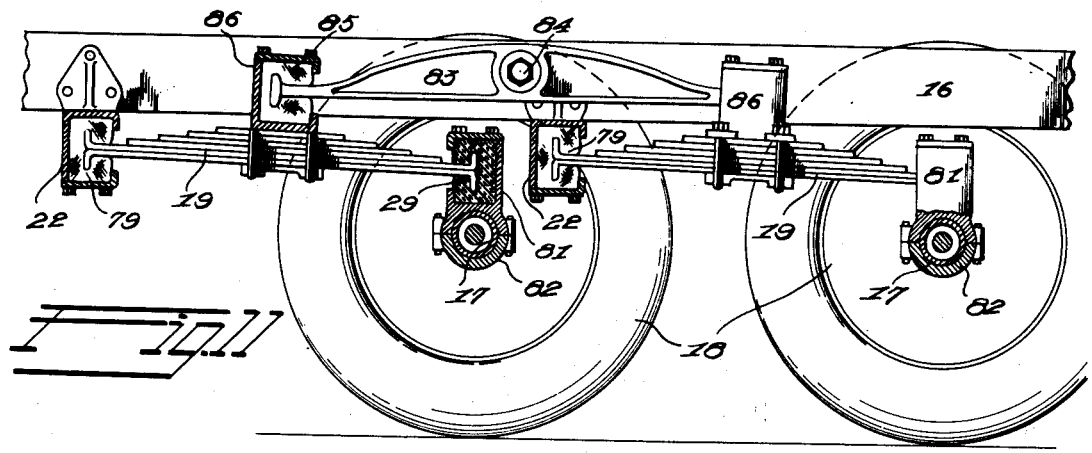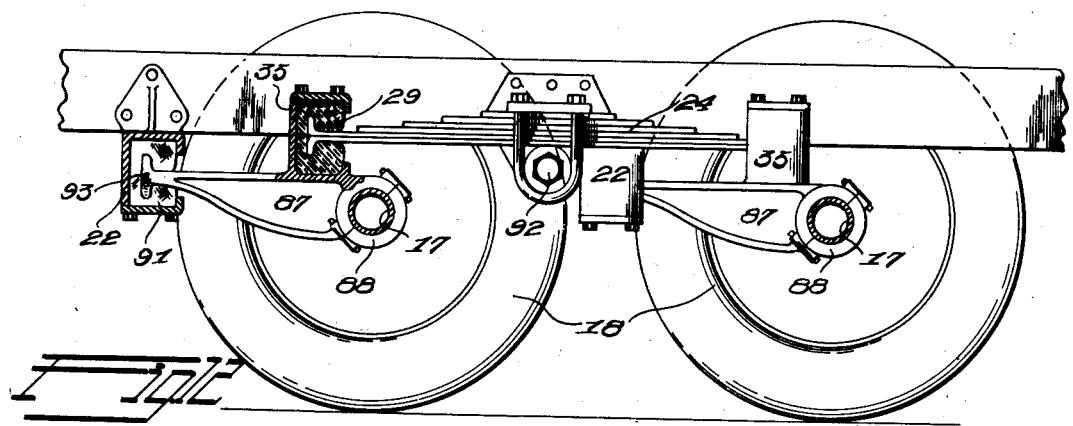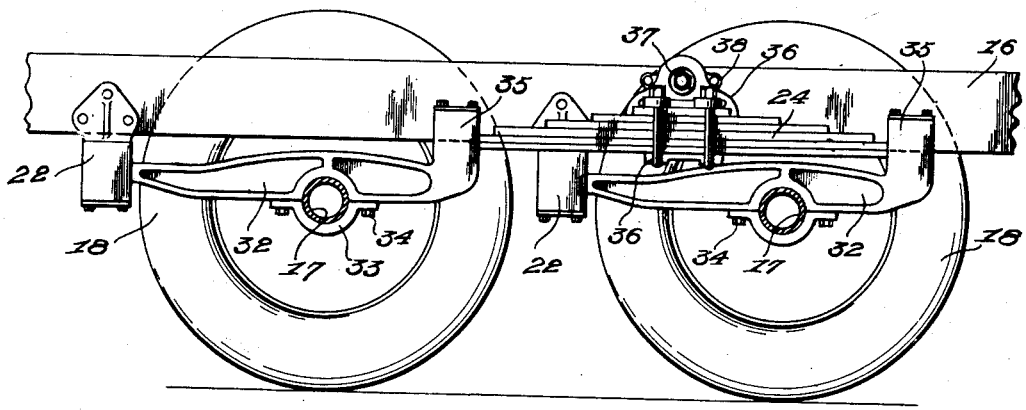

Inventor
Arthur I. Marcum
By Strauch & Hoffman
Attorneys

Patented Oct. 3, 1933

1,928,860

UNITED STATES PATENT OFFICE 1,928,860

FLEXIBLE SUSPENSION FOR MULTI-WHEEL VEHICLES

Arthur I. Marcum, Oakland, Calif., assignor, by mesne assignments, to Automotive Engineering Corporation, a corporation of Delaware Application February 3, 1930. Serial No. 425,594

4 Claims. (Cl. 280—104)

This invention relates to suspension systems for all types of vehicles, and particularly to flexible suspensions for road vehicles wherein a pair of tandem axles is arranged at one or both ends of the vehicle frame, and wherein the tandem axles of each pair are connected to the frame in such manner that the load and the road shocks are properly divided between the axles and at the same time the latter are free to swing and to tilt without undue restriction.

Heretofore it has been standard or common practice to build suspensions entirely, or in greater part, from metal springs and links, and from horizontally pivoted shackles of a rigid nature. Combinations of such elements, particularly in multi-wheel suspensions of the compensating type, are rather expensive. Furthermore, they are apt to result in the attainment, through necessary clearness and wear of parts, of undesirable flexibility such, for example, as lateral shifting of the axles to produce drag on the tires. Moreover, the rigid links and shackles, in spite of their flexibility, tend through their horizontal pivots to restrict certain phases of the flexibility otherwise permitted. For instance, they cause the spring leaves to twist about their longitudinal axes when the ends of the axles tilt with respect to each other in transverse vertical planes.

Accordingly, it is a primary object of this invention to eliminate the foregoing defects and disadvantages. More specifically, several objects of the invention consist in replacing certain or all of the spring beams with rigid beams or arms, and in substituting, for the conventional links and shackles, connecting devices embodying resilient and deformable material, such as rubber, in which the ends of the beams or arms may be inserted or embedded. The number of substitutions made will depend upon the arrangement and inherent characteristics of the particular suspension to be considered, the use to which the vehicle is to be put and the conditions of the roads over which the vehicle will normally be driven. The rubber connections serve to prevent spring twistage and beam breakage, and to absorb and cushion portions of the road shocks. This invention further contemplates the utilization of additional rubber blocks at other and various points throughout the suspension as, for instance, at the axle interconnections to cushion shocks and to permit unhampered transverse tilting movement of the ends of each axle with respect to each other.

Another important object is to provide a vehicle suspension in which the axles are completely insulated from the frame by a non-metallic cushioning material; and in this connection to procure said complete insulation even though the axles may support other elements of the suspension in direct metal to metal contact therewith.

In the above respects this invention represents a continuation in part of the invention disclosed in my copending application, Serial No. 32,357, filed May 23, 1925.

A further object of this invention lies in the provision of means, associated with either a single axle or a multiple axle suspension, for permitting the ends of each axle to rise and fall with respect to each other and the frame without subjecting the springs, arms or other elements to destructive stresses.

Other objects of the invention are to provide novel and practicable multi-wheeler suspensions of the load and shock equalizing type; and to incorporate therein the features and principles set forth in the preceding objects.

Further objects will become apparent from a study of the following detailed description when taken in connection with the accompanying drawings, in which:

Figure 1 illustrates, in side elevation with the near wheels removed for purposes of clarification, one end of a multi-wheel chassis involving one of the suspensions of this invention. The shackles are shown in section. This figure is carried forward from said copending application Serial No. 32,357.

Figure 2 shows a modified form of the device of Figure 1, certain shackles having been shortened to lower the trunnion mounting, and certain spring beams having been replaced by rigid beams.

Figure 3, showing a preferred embodiment of this invention, is a modification of the forms of Figures 1 and 2 with special swiveling shackles substituted for the deformable type.

Figure 4 represents a vertical section taken through one side of the frame, showing a modified form of the frame-attached shackles of Figure 3.

Figure 5 shows a partial detailed section of another modified form of shackle that may be substituted for the frame-pivoted shackles in Figure 3.

Figure 6 illustrates the adaption of the invention of Figures 3, 4 and 5 to a suspension involving but one axle.

Figure 7 is a partial detailed sectional view of one of the shackles of Figure 6.

Figure 8 represents a vertical section taken on the plane indicated by line 8—8, Figure 6.

Figure 9 discloses, in side elevation, a rubber block which may be substituted for the coil springs of Figures 5 and 7.

Figure 10 constitutes an end elevation of the block of Figure 9.

Figure 11, another modification, shows another type of equalizing suspension, similar to that of Figure 1 but employing flexible shackles at the axles.

Figure 12 illustrates a modified form of the construction of Figure 11.

Figure 13:
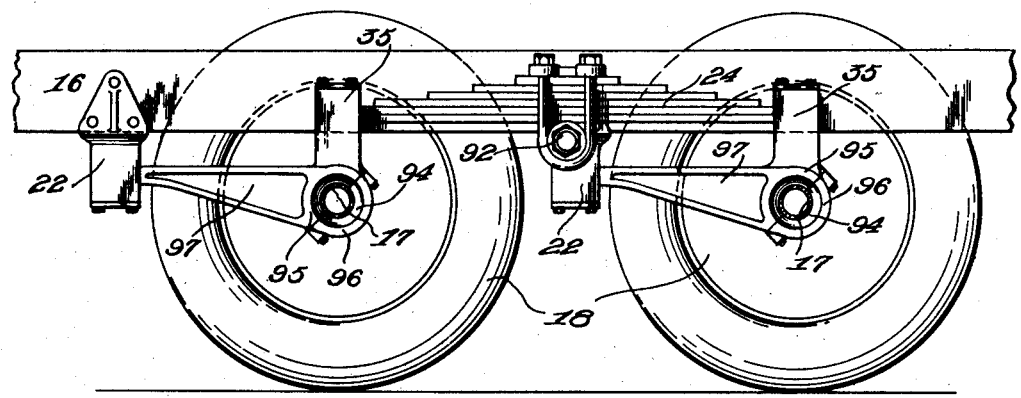

Figure 13 represents a still further modification, carrying forward the principles of Figure 12 into a construction requiring but two supporting brackets.

Figure 14:
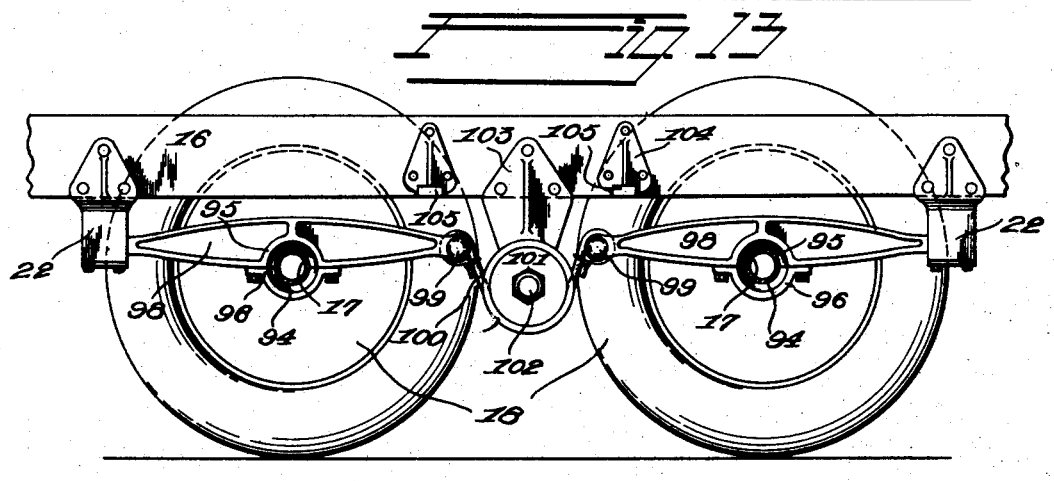

Figure 14 constitutes a further modification in which an equalizing means of unlimted flexibility is used to interconnect the axles.

Figure 15:
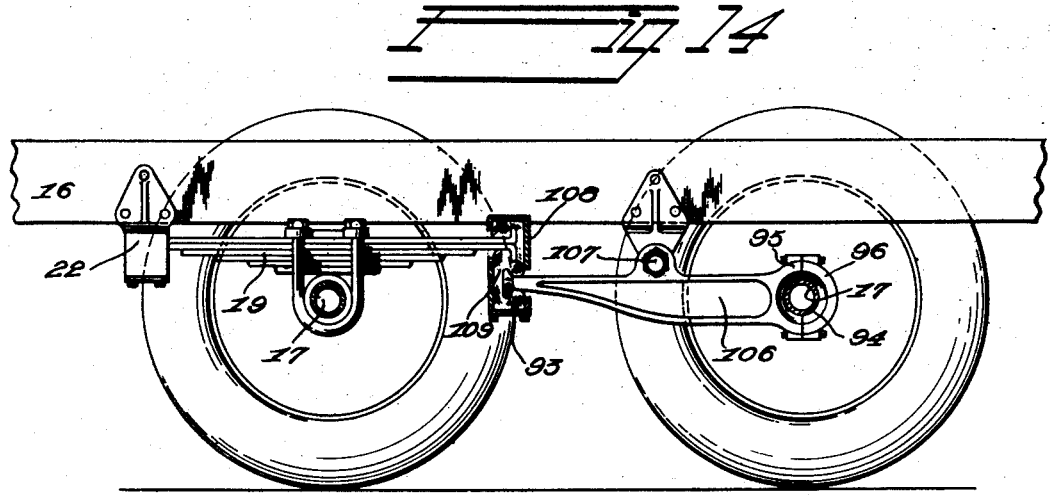

Figure 15 illustrates another modified form, in which a two-point suspension is evolved from the three-point types shown in some of the other figures.

It will be understood and obvious that any of the illustrated suspensions may be incorporated in six, eight or multiple wheeled vehicles under either end or any portion of the vehicle frame; and that the axles may be of either the full transverse or the stub type, with each or any axle driven or idle, as desired. The drive (not shown) may be either sprung or unsprung. In the case of driven or braked axles, the torque reactions may be neutralized by devices (not illustrated) in any conventional or suitable manner.

With reference now to the drawings, in which like numerals designate like parts, and with particular reference to Figure 1, a chassis frame 16 has a pair of tandem axles 17 arranged beneath it and supported by wheels 18. Each end of each axle has an individual spring beam 19 connected thereto intermediate the ends of the latter by a U-bolt clamping assembly 21. The forward end of each beam 19 is flexibly and directly connected to the frame by way of a bracket-supported shackle housing 22. The ends of the upper leaves of the springs are bent into vertical planes, as shown, and embedded in deformable rubber blocks 23.

An equalizing spring beam 24 is pivoted, by means of a U-bolt clamping assembly 25, upon a transverse horizontal trunnion 26, with the ends of said beam superposed over the rear ends of the beams 19 and respectively connected thereto by special shackles 27. Each shackle 27 comprises a pair of integrally connected housings 28 similar to housings 22 and receiving one of the pairs of superposed spring ends in rubber blocks 29 in the same manner that the blocks 23 receive the front ends of springs 19. A rectangular slot 31 is provided in each housing to receive its corresponding spring end and to permit spring deflection without restriction.

From the foregoing description it will be observed that each axle is permitted to swing bodily in a definite arc, due to the deformability of blocks 23; and that the equalizing beam 24 oscillates to equalize the load upon the axles and to transmit portions of road shocks from one axle to the other as the vehicle passes over road irregularities. The rubber blocks 23 and 29 permit the above mentioned movements without positive restriction, and yet yieldingly resist and dampen them to prevent the too free and flexible relative movements of the suspension elements, that are permitted by the conventional metal pivoted shackles. The rubber blocks also serve to cushion and absorb shocks, thereby permitting rigid beams to be substituted for spring beams when desired. They require no lubrication whatsoever.

When the ends of an axle rise and fall with respect to each other, with beams clamped directly thereon as illustrated, said beams partake of the axle movement and are oscillated about their longitudinal axes. If conventional rigid shackles on horizontal pivots were used they would prevent oscillation of the beam ends and thus cause twisting or breaking of the beams. In the structure illustrated in Figure 1, however, the rubber blocks 23 and 29 yield sufficiently to permit the axle ends to rise and fall without the imposition of destructive stresses in and upon the beams 19 and 24.

In the form shown in Figure 2, the apparatus of Figure 1 has been modified as follows: Rigid beams 32, secured to the axles by caps 33 and bolts 34, have been substituted for the spring beams 19 and are shackled to the frame at their forward ends by rigid housings 22. The ends of the beams are gripped in rubber blocks in the manner illustrated in Figure 12, later to be described. The housings 29 of Figure 1 have been eliminated in favor of single housings 35 rigid and integral with the rear ends of the beams 32. These changes permit the equalizing beam 24 to be lowered to such extent that the frame needs no kick-up to provide a trunnion support or oscillation space for the axles. Spring 24 has its ends received in the housings 35 in the same manner that they were supported in housings 29 of Figure 1, and has its mid-portion clamped in a U-bolt assembly 36 that is pivoted on a trunnion 37 carried on a frame bracket 38.

This modification functions in substantially the same manner as that of Figure 1, but is more compact and has less overall resiliency and flexibility.

Figure 3 discloses a further modification of the same type of equalizing suspension. The axles support the central portions of individual spring beams 19, the top leaves of which are straight instead of being bent at their ends as in Figure 1. The forward end of each spring is connected to the frame by a special swiveling shackle comprising a bracket 39, a split cylinder 41 pivoted to swing below said bracket on a horizontal transverse bolt 42 which projects through bracket 39 and an eye lug 40 cast integral with said cylinder, and a split cylindrical block 43 fitted within said cylinder and adapted to rotate, but not to reciprocate, therein. The rear end of each cylinder is slotted as at 44 to permit free insertion of the end of spring 19, and the block comprises two substantially semi-cylindrical halves, as shown, between which the inserted end of the longest leaf of spring 19 is supported and secured against reciprocative movement by a pin 46 which passes through said block and said leaf.

A rigid equalizing beam 47 is pivoted at its center on a frame-supported trunnion 48, and its ends depend into proximity to the rear ends of the spring beams 19. The front end of beam 47 carries a horizontal pin 49 to which a split cylinder 51 is swingingly pivoted, and the latter in turn carries an internal block 52 made up of two sections, as shown, which support and guide the rear end of the longest leaf of beam 19. This block, like block 43, is cylindrical and rotatable within the cylinder, but is somewhat shorter than the cylinder bore and therefore adapted to reciprocate therein. The leaf-engaging sides of the block sections are relieved, as at 53, in order to permit spring deflection, and the forward end of the cylinder is slotted, as at 54, for the same purpose. An identical shackle to that just described is employed to connect the rear end of beam 47 with the rear end of rear spring 19.

Figure 4, representing a modified type of swiveling shackle, shows such a section as would be seen when looking in the direction of arrow A, Figure 3, after the modified shackle had been substituted for that of Figure 3. It comprises a bracket 39ª secured to the frame 16 and provided with an integral sleeve bearing 40 for receiving a bolt 45 the shank of which provides a pivotal support for the eye lug 55 of a cylinder assembly 41'. A rubber ring 56, faced with a pair of metal washers 57, is mounted on the pivot bolt 45 between the eye lug 55 and the bracket sleeve 40, and is maintained in compression between said elements by drawing up on a nut 58. This ring serves to prevent undesirable or excessive flexibility, by dampening or yieldingly resisting the swinging of the cylinder 41' about the pivot bolt as the corresponding spring 19 deflects to change its length when passing over irregular road surfaces. The cylinder assembly 41ª is exactly like that of Figure 3 except for the fact that the cylinder is not horizontally split into two sections, but instead is provided with a detachable end cap 59. This cap preferably is centrally convex, as indicated at 61, to form a lubricant reservoir within the cylinder, whereby greasing service is necessary but infrequently.

Figure 5 discloses a modified type of cylinder assembly which may be utilized in Figures 3 and 4. It comprises a cylinder 41ᵇ having a detachable end cap 59ª and an integral pivoting eye-lug 55ª, a split cylindrical block 43ª having its sections secured to spring 19 by a pin 46, and a pair of opposed compression springs 62 fitted between the corresponding ends of the block and cylinder. Whereas the block 43 of Figure 3 is incapable of reciprocation, block 43ª of Figure 5 is capable of such movement subject, however, to the resistance of the coil springs 62.

In operation, the devices of Figures 3, 4 and 5 function in a manner to that of Figure 1. The rotation of the cylindrical blocks relative to their cylindrical housings permits the ends of the axles to tilt relative to one another without subjecting the springs to destructive stresses. The horizontal shackle pivots give the suspension sufficient flexibility to permit the axles to oscillate bodily in traversing uneven road surfaces. The slots 44 and 54 prevent restriction of this flexibility.

Figures 6, 7 and 8 illustrate the adaptation of swiveling shackles to a single-axle suspension such as might be used at the opposite end of the frame 16 of Figure 3. A wheel-supported axle 63 is disposed beneath the frame and has clamped thereon a spring beam 64 the opposite ends of which project into the open ends of a pair of cylinders 65 and 66. Cylinder 65 is rigidly secured to the frame by an integral bracket 67, and cylinder 66 is likewise secured by a bracket 68. The internal mechanisms of the cylinders are identical, each comprising a pair of almost semi-cylindrical blocks 69 and 71 respectively, provided on their flat surfaces with bearing points 72 in engagement with the flat surfaces of an end of the upper leaf of spring 64; a pin 70 for securing said blocks and spring leaf together for unitary movement; and a coil spring 73 abutting those ends of the blocks that are furthermost from the axle. A cover plate 74 is detachably secured to the outer end of each cylinder and abuts the coil 73 contained therein to maintain it in compression. Each cover carries a nipple 75 of the check valve type through which a large supply of lubricant may be injected into the space within the corresponding coil spring.

The provision of the projecting bearing points 72 provide sufficient clearance between the block sections 69 and 71 to permit freedom of spring deflection. The coil springs serve to centralize the axle and to absorb vibrations and minor road shocks as the block sections reciprocate. Each spring and its axle end may rise and fall with respect to the other without twisting the springs or cylinder brackets, due to the freedom of rotation of the block sections within the cylinders.

In Figures 9 and 10 I have shown a type of rubber block that may be substituted for the coil springs of Figures 5 and 7. This rubber block, 76, is shaped like a shortened thread spool, being cylindrical and provided with a peripheral groove 77 and an axial hole 78. The groove and the hole provides space into which the material of the body may flow when road shocks compress said body by forcing the flat ends thereof toward each other.

The suspension system of Figure 11 differs from that of Figure 1 in that the spring beams 19 are inverted and resiliently secured at their ends to the axles instead of being positively clamped thereto intermediate their ends; and in that the equalizing beam has its ends connected to intermediate portions of the spring beams instead of at the ends thereof. Further differences will be apparent from the description of Figure 11 which follows.

Each spring 19 is connected at its forward end to a rigid frame-supported housing 22, being pivotally held therein by a rubber body 79. The rear end of each spring 19 is embedded in a rubber block 29 which is mounted within a shackle housing 81 that is supported upon the upper surface of an axle. A complemental cap 82 co-operates with said housing to maintain the latter in position upon the axle. It will be observed that the rubber blocks 29, shown in section, completely enclose the spring ends and hence, alone and unaided by blocks 79, may yield sufficiently to permit the housings 81 to tilt relative to said spring ends as the axle ends rise and fall with respect to each other. For this reason the forward ends of springs 19 may contact at their edges with the side walls of housings 22, in this manner permitting only a swinging movement of the springs in vertical planes. The assembly in Figure 11 is completed by a rigid load supporting and equalizing lever 83, trunnioned upon the frame as at 84 and having its ends gripped in rubber blocks 85 that are carried within spring-supported housings 86.

The apparatus of Figure 12 represents a cross between those of Figs. 2 and 11. It comprises a pair of rigid arms 87, each clamped at its rear end upon an axle 17 by a detachable cap 88 and each having its forward end or tip 89 pivotally gripped in a body 91 of rubber that is tightly inserted in a frame-carried housing 22; and an equalizing spring beam 24 centrally pivoted on a trunnion 92 and having its ends completely embedded in rubber blocks 29 carried by housings 35. These housings are rigidly supported and integrally formed upon the rigid arms, immediately adjacent the axles. The forward end of each arm 87 is T-shaped in appearance, as shown, and its sides are rounded to form rocking points, as at 93, which cooperate with the housing side walls to permit the arms 87 to oscillate about their longitudinal axes in response to up and down movement of the axle ends.

Figure 13 discloses a suspension substantially like that of Figure 12, the main differences being that the ends of the equalizing beam have been placed directly over the axles, that the front pivot of the rear arm has been disposed substantially in vertical alignment with the trunnion axis, and that additional rubber blocks have been inserted in the combination. The added blocks consist of split rubber bodies 94 of doughnut shape, encircling the axles and clamped thereon by means of a pair of complemental semi-cylindrical housings 95 and 96. The housings 95 constitute integral portions of rigid beams 97 which project forwardly into frame-carried boxes 22 to be supported and maintained therein in the same manner as were the spring ends in Figure 11. Upright shackle boxes 35 are integrally formed upon housings 95 directly over the axles. These boxes receive the ends of an equalizing spring 24, as is shown more fully in Figure 12, and said spring is pivoted on a trunnion 92 that is disposed substantially in vertical alignment with the rear box 22. In this form the suspension is not quite as flexible as some of the others described, but it has greater cushioning and dampening qualities. The rubber doughnuts 94 are sufficiently yielding to permit universal axle movement relative to the beams 97, and hence the other rubber blocks need not be relied upon to relieve the beams of destructive stresses when one end of an axle tilts with respect to its other end. This is also true of both axles in Figure 14, and of the rear axle in Figure 15.

Figure 14 shows a somewhat different arrangement, wherein the axles swing in opposed, instead of parallel, arcs. The shackle boxes 22 are sufficiently spaced from each other to receive the forward end of a front beam 98 and the rear end of a rear beam 98, the manner of connection being the same as in Figure 13. Intermediate their ends the beams 98 are provided with integral housing sections 95 which cooperate with detachable housing sections 96 to clamp the rubber doughnuts 94 upon the axles 17. The free ends of the beams 98 carry horizontally journaled pins 99 which are interconnected by one or a plurality of flexible cords or belts 10, which are maintained in tension by engagement with the rim of a load-supporting wheel 101. Wheel 101 is of the pulley block type and freely rotates on a trunnion 102 carried by a frame-bracket 103. The flexible members 100 preferably consist of strong elastic material such as aeroplane cord, a cord comprising a rubber body with a fabric covering. Above the interconnected ends of the rigid beams is disposed a pair of brackets 104 each of which supports a bumper 105 which acts as a stop element to prevent excessive beam oscillation when passing over abnormally rough roads, and to maintain the suspension operative in case of cord breakage.

From the above description it will be understood that the cord 100 and wheel 101 constitute an equalizing and compensating device for obtaining proper load distribution upon the axles and for transmitting shocks, after partial absorption, from one axle to the other. Moreover, complete flexibility is secured in spite of the total absence of springs.

The apparatus of Figure 15 is a modification of all of the previous forms, showing the adaption of all the principles thereof to a suspension which is connected to the frame at only two points. It comprises a front spring 19 attached at its forward end to a shackle box 22 (in the same manner as in Figure 1), and positively clamped upon an axle 17 intermediate its ends; a rigid beam 106 cushioningly mounted at its rear end upon the other axle and pivoted intermediate its ends upon a frame-carried trunnion 107; and a shackling box 108 receiving the free ends of said spring and said rigid beam. These free ends are gripped and cushioned in a rubber block 109. The front tip of beam 106 is rounded to a point 93, as indicated, in order to permit universal movement of said tip with respect to the box 108.

It will be observed that the rigid beam 106 serves as a load-supporting beam, as a radius arm, and as an equalizing lever. The rubber doughnut 94 permits all tilting movement of the rear axle; and the shackle assembly 22 cooperates with rounded tip 93 of the beam 106 to permit the front axle, spring 19 and shackle box 108 to tilt as a unit, and hence to tilt without imposing any destructive forces upon the suspension elements.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In combination, a vehicle frame, tandem axles disposed at one end of said frame, ground-engaging wheels supporting said axles, and a suspension at each side of said frame for supporting the latter upon said axles, each suspension comprising a beam individual to each axle and pivotally connected at one end to a portion of said frame, and an equalizing beam pivotally connected intermediate its ends to said frame and having its ends connected to said individual beams at points spaced from the frame-connected ends of the latter, certain of the above named connections comprising flexible devices permitting the axles to swing and tilt at all times without imposing destructive stresses upon the elements of the suspension.

2. In the apparatus defined in claim 1, said flexible devices comprising deformable rubber blocks inserted between said individual beams and their corresponding axles.

3. In the apparatus defined in claim 1, said flexible devices comprising deformable rubber blocks yieldably interconnecting said individual beams and said frame, and similar rubber blocks interconnecting said individual beams and the ends of said equalizing beam.

4. A multi-wheel road vehicle comprising a frame, tandem axles disposed at one end of said frame, wheels supporting said axles, and a suspension at each side of said frame for supporting the latter upon said axles, each suspension comprising a beam individual to each axle and positively attached thereto intermediate its ends, devices interconnecting the forward ends of said beams with said frame, including means permitting said beams to oscillate about their longitudinal axes without restriction, an equalizing beam trunnioned upon said frame with its ends in proximity to the rear ends of said individual beams, and devices, of the nature of said first-mentioned devices, interconnecting said ends of the equalizing beam with said rear ends of the individual beams.

ARTHUR I. MARCUM.